(12) United States Patent
Capt et al.

(10) Patent No.: US 9,906,614 B2
(45) Date of Patent: Feb. 27, 2018

(54) REAL-TIME CONTENT SHARING BETWEEN BROWSERS

(71) Applicant: Adobe Systems Incorporated, San Jose, CA (US)

(72) Inventors: Alexandre Capt, Landser (FR); Damien Antipa, Saint-Louis (FR); Ondrej Florian, Allschwil (CH)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 233 days.

(21) Appl. No.: 14/269,342

(22) Filed: May 5, 2014

(65) Prior Publication Data

US 2015/0319197 A1 Nov. 5, 2015

(51) Int. Cl.
| | |
|---|---|
| *H04L 29/08* | (2006.01) |
| *H04L 29/06* | (2006.01) |
| *G06F 17/30* | (2006.01) |
| *H04W 4/06* | (2009.01) |
| *H04L 12/18* | (2006.01) |
| *H04W 4/02* | (2018.01) |

(52) U.S. Cl.
CPC .......... *H04L 67/26* (2013.01); *G06F 17/3089* (2013.01); *G06F 17/30861* (2013.01); *H04L 65/403* (2013.01); *H04L 67/02* (2013.01); *H04L 67/104* (2013.01); *H04L 67/42* (2013.01); *H04W 4/06* (2013.01); *H04L 12/1854* (2013.01); *H04W 4/023* (2013.01)

(58) Field of Classification Search
CPC ............... H04L 12/1854; H04L 67/104; G06F 17/3089; G06F 17/30861
See application file for complete search history.

(56) References Cited

U.S. PATENT DOCUMENTS

| | | | | |
|---|---|---|---|---|
| 6,148,330 A | * | 11/2000 | Puri | ................... G06F 17/30867 707/E17.109 |
| 2006/0015763 A1 | * | 1/2006 | Nakajima | ............... H04L 29/06 714/4.1 |
| 2006/0128349 A1 | * | 6/2006 | Yoon | ....................... H04L 12/12 455/343.2 |
| 2009/0119363 A1 | * | 5/2009 | Suzuki | ............. G06F 17/30876 709/203 |
| 2010/0017412 A1 | | 1/2010 | Horowitz et al. | |
| 2010/0070842 A1 | | 3/2010 | Aymeloglu et al. | |

(Continued)

*Primary Examiner* — Jeong S Park
(74) *Attorney, Agent, or Firm* — Finch & Maloney PLLC

(57) ABSTRACT

Techniques are provided for selectively broadcasting information from a sender's computer to one or more recipient computers in real-time. A user connects to a networked content server and browses selected content items which are determined to be of interest to other collaborators. The user activates a content sharing mode and indicates which content is to be shared. A reference to the shared content is sent to the server which in turn pushes the referenced content to identified content recipients. Content recipients can be identified based on a variety of factors, such as by subscription to a listening channel opened by the content sender, by individual selection by the content sender, and/or by geolocation. The shared content can be automatically displayed to each identified content recipient non-intrusively. Content can be pushed to the content recipients via a persistent open communication channel established between the content server and content recipients.

20 Claims, 4 Drawing Sheets

(56) References Cited

U.S. PATENT DOCUMENTS

| | | | |
|---|---|---|---|
| 2010/0191799 A1* | 7/2010 | Fiedorowicz | G06F 17/30873 709/203 |
| 2012/0246228 A1* | 9/2012 | Udezue | H04L 12/1859 709/204 |
| 2012/0290951 A1* | 11/2012 | Utsuki | H04L 67/02 715/753 |
| 2013/0110941 A1 | 5/2013 | Lewis et al. | |
| 2013/0290516 A1* | 10/2013 | Eaton | G06F 17/3089 709/224 |
| 2014/0022183 A1* | 1/2014 | Ayoub | H04W 4/023 345/173 |
| 2014/0188989 A1* | 7/2014 | Stekkelpak | H04L 67/02 709/204 |
| 2014/0351417 A1* | 11/2014 | Chan | G06F 17/3089 709/224 |

\* cited by examiner

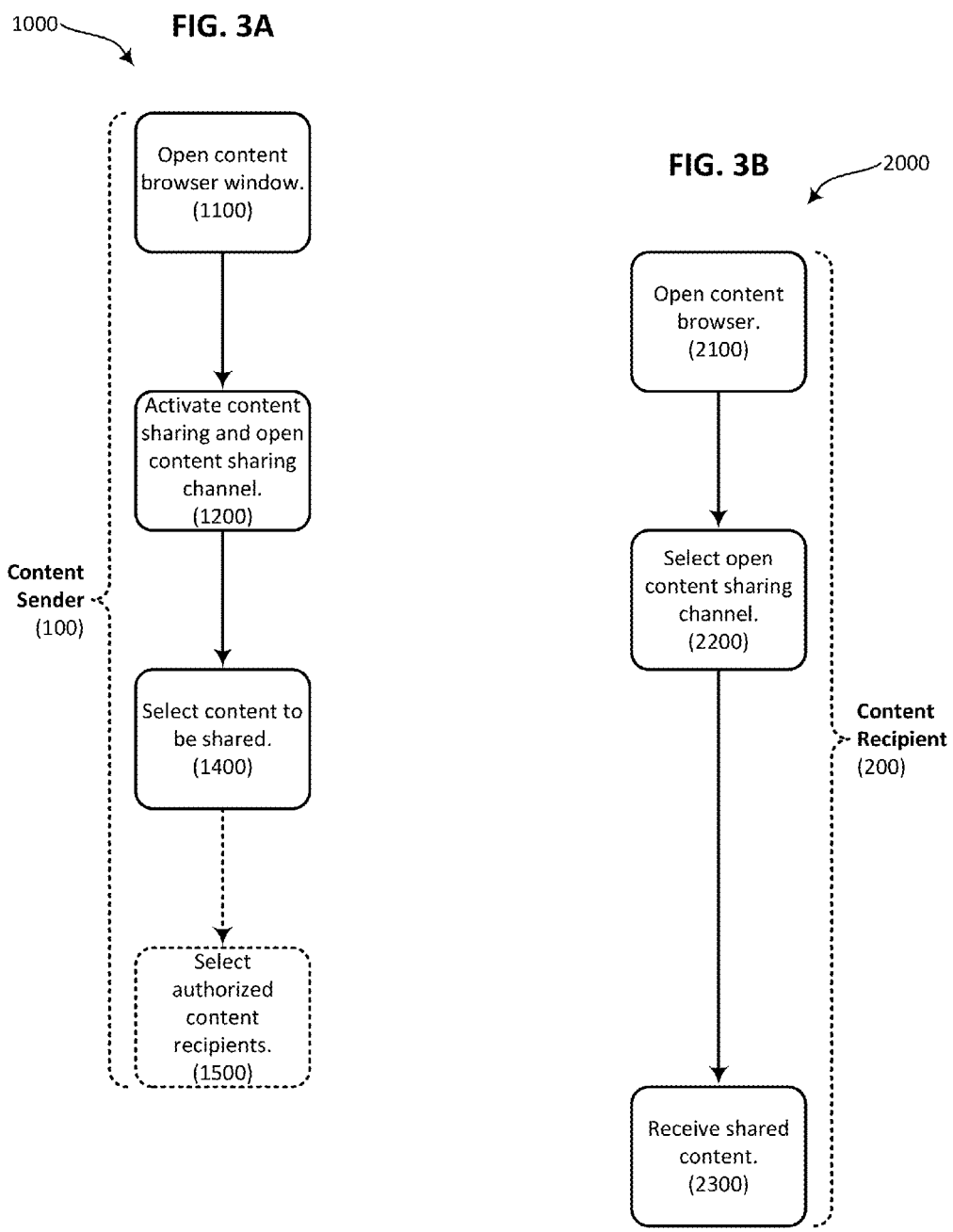

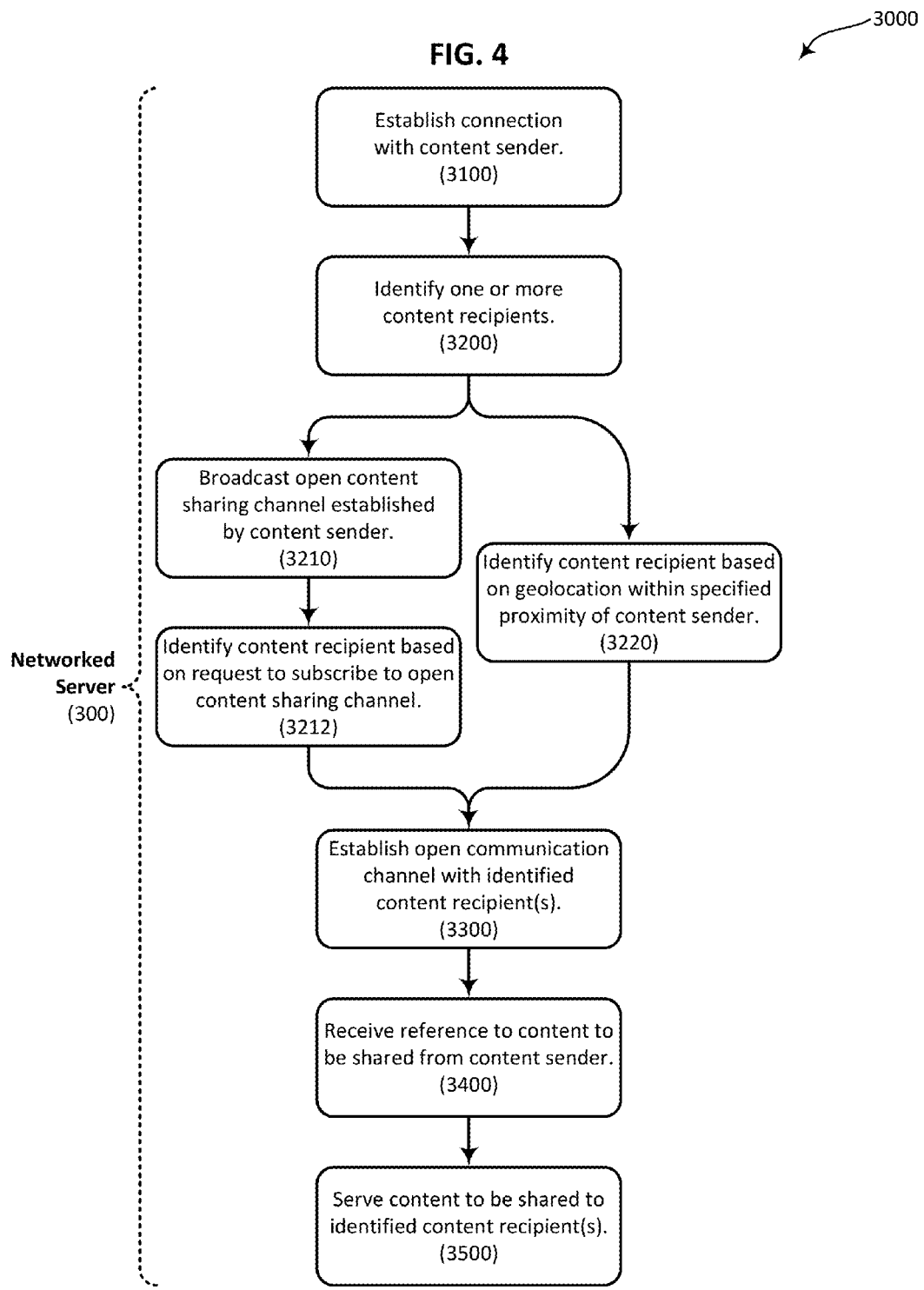

REAL-TIME CONTENT SHARING BETWEEN BROWSERS

FIELD OF THE INVENTION

This disclosure relates generally to data sharing between networked computers, and more specifically to methods that facilitate the selective real-time broadcast of displayed information from a sender's computer to one or more recipient computers.

BACKGROUND

As modern computing devices have become increasingly compact and portable, consumers have come to expect their smartphones, tablet computers, laptop computers, and other portable computing devices to be well-suited for a variety of mobile applications. These trends have resulted in the incorporation of a variety of hardware features and software functionality into such devices. One particular class of software applications which has proven to be both useful and commercially successful, especially for portable computers, is remote desktop software applications. Such applications allow a desktop environment generated at a source computer to be displayed at a remote computer. The remote computer is often some type of portable computing device, although this is not necessarily the case. The two computers can communicate with each other via the Internet or another suitable communications medium. The communications generally conform to a platform-independent remote desktop protocol, thereby allowing cross-platform sharing to occur. Keystrokes, mouse clicks, and other user interface interactions registered at the remote device can be transmitted to, and invoked at, the source computer as if such interactions were provided directly at the source computer itself. Remote desktop software is often used for user support, education, collaboration, and remote administration applications, although a wide variety of other applications exist. Examples of commercially available remote desktop software include Windows Remote Desktop Connection (Microsoft Corporation, Redmond, Wash.) and VNC (RealVNC, Cambridge, UK).

BRIEF DESCRIPTION OF THE DRAWINGS

FIG. 3A is a flowchart illustrating an example method of broadcasting shared content from the perspective of a content sender.

FIG. 3B is a flowchart illustrating an example method of receiving broadcasted content from the perspective of a content recipient.

FIG. 4 is a flowchart illustrating an example method of using a networked server to manage broadcast communications between a content sender and a content recipient.

DETAILED DESCRIPTION

Figure 1:
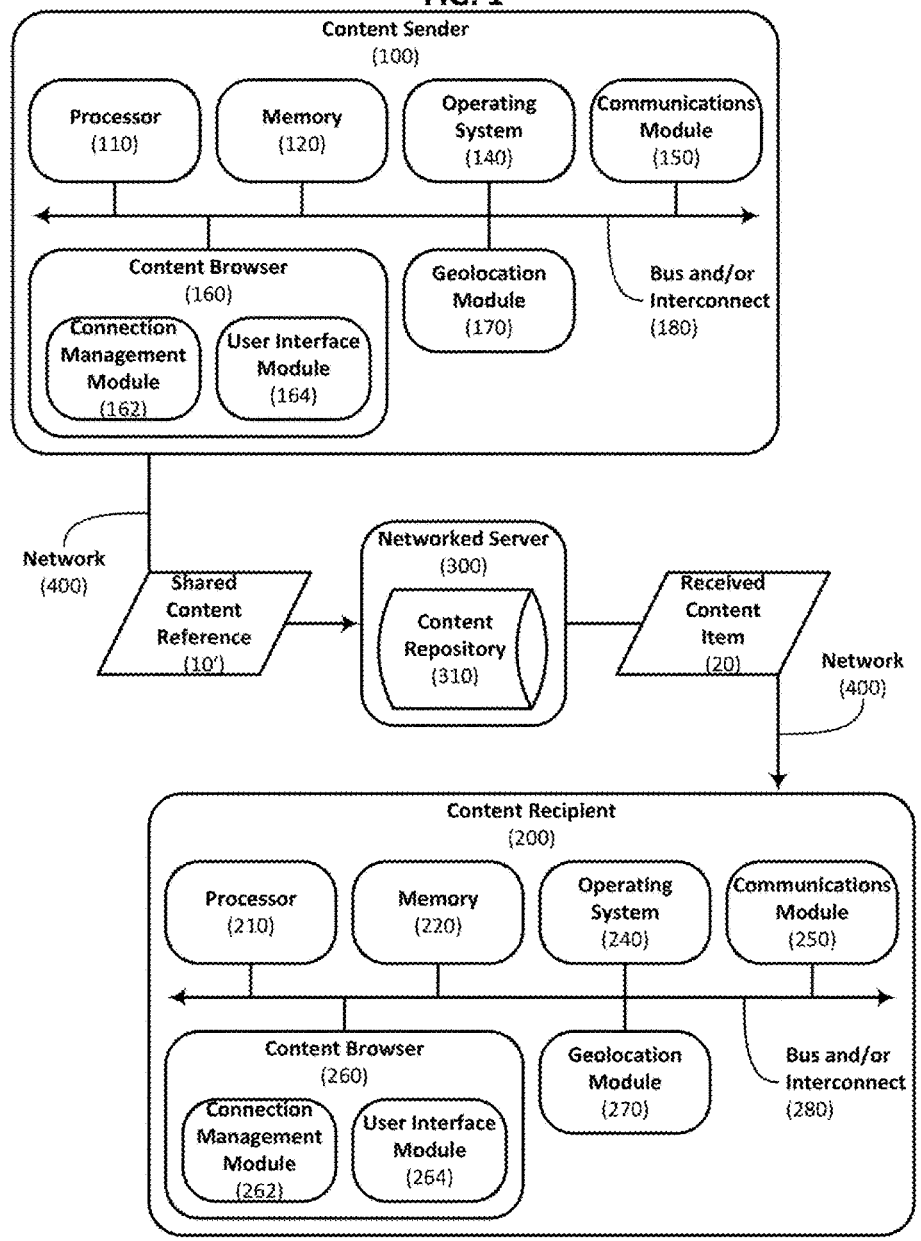
FIG. 1 is a block diagram schematically illustrating selected components of a computer system that can be used to implement certain of the embodiments disclosed herein.

As smartphones, tablet computers, and other portable computing devices have become increasingly ubiquitous, consumers now expect that it will be easy to use such devices to share digital content with other users of such devices. Inter-device communication is particularly useful in the context of multiuser collaboration, where multiple users work together with shared content items in real-time. The multiple users may share a common physical location, such as when they meet or attend a presentation together, or one or more of them may be remotely located, such as in the case of a teleconference or a remote working group. Regardless the users' physical location, enabling them to share and simultaneously view content items can significantly increase the efficacy of the collaborative effort. Despite this, existing content sharing tools tend to suffer from a number of shortcomings. For example, a person attending a meeting or a presentation may have a content item that would be of interest to the presenter and/or other attendees. Because the sharer's portable device will often be small and not necessarily visible to all attendees, physically displaying the sharer's screen to other attendees is unsatisfactory. Remote desktop software is not well suited for a collaborator who wishes to share only selected content items, and in any event, using such software raises security concerns with respect to allowing remote control of a local computer. Existing remote desktop software applications also generally require a native application to be installed on both of the connected computers, thus making implementation more cumbersome for impromptu collaboration sessions. Another solution would be for the user who wishes to share content to interrupt the meeting or presentation and provide a reference to the content item which is to be shared. This reference will generally comprise a network address, which requires other attendees to individually navigate to the target content via a sequence of browsing operations. The result is still an inefficient and time-consuming process that precludes instantaneous sharing of content amongst collaborators.

Thus, and in accordance with certain of the embodiments disclosed herein, techniques are provided for selectively broadcasting information from a sender's computer to one or more recipient computers in real-time. For instance, in certain embodiments a user connects to a networked content server that is also accessible by members of a larger user group. The user group may comprise, for example, users attending a collaborative working session or presentation. Using a conventional content browser, such as a web browser, the user browses selected content items which are determined to be of interest to other group members. The user activates a content sharing mode and provides user input that indicates which content is to be shared with other group members. A reference to the shared content is sent to the server which in turn pushes the referenced content to identified content recipients. Content recipients can be identified based on a variety of factors, such as by subscription to a listening channel opened by the content sender, by individual selection by the content sender, and/or by physical proximity to the content sender. Regardless of how the content recipients are identified, the shared content can be automatically displayed to each identified content recipient in a non-intrusive way, such as by appearing in a content browser window or via a system tray notification message. Examples of content items which are well-suited for sharing using the techniques disclosed herein include presentation slides, data cards, infographics, spreadsheets, and text-based documents, although it will be appreciated that other content types may be shared in other applications. Numerous other configurations and variations of the real-time content sharing techniques described herein will be apparent in light of this disclosure.

Certain of the embodiments disclosed herein advantageously provide real-time sharing of selected content items between users without any need for content recipients to navigate to the shared content. Once sharing is enabled, content can be broadcast from a content sender with a single user input, such as a single gesture made on a touch sensitive surface. Such embodiments are therefore particularly well-suited for implementation using touch-based devices such as the smartphones and tablet computers which users are likely to take to meetings, presentations and other collaborative working sessions where content sharing is apt to be particularly useful. However other embodiments can be implemented in the context of collaborative content assembly wherein a primary content author relies on other users to aggregate content to be included in a finished work product and to broadcast the aggregated content to the primary author. The various embodiments disclosed herein also provide a content sender with the flexibility to selectively share only those content items provided within a designated browser window, thereby providing greater control over content sharing as compared to existing remote desktop software applications. Implementing the content sharing techniques disclosed herein using browser functionality also eliminates any need for users to install dedicated sharing applications on their respective devices.

Certain of the embodiments disclosed herein can also be used outside the context of collaborative content sharing, such as to quickly send content items from the small screen of a portable device to a larger display or projected screen. This allows a user to quickly shift from using a portable device to using a device with a larger display without having to reacquire content which the user had been working with on the portable device. Such implementations may be particularly useful in a retail commerce environment. For example, a shopper browsing merchandise on a smartphone or other portable computing device can send the browsed content to a larger display screen provided in a brick-and-mortar retail setting, thereby allowing the browsed content to be viewed and discussed by a wider audience than just those who can view the individual shopper's portable device.

As used herein, the term "content" refers, in addition to its ordinary meaning, to information intended for direct or indirect consumption by a user, organization, or other human- or computer-controlled entity. For example, the term content encompasses information directly consumed by a user such as when it is displayed on a display device or printed on a piece of paper. The term content also includes information that is not specifically intended for display, and thus also encompasses items such as software, software applications, mobile applications, executable instructions, scripts, hyperlinks, addresses, pointers, metadata, and formatting information. The use of the term content is therefore independent of (a) how the content is presented to a user for consumption and (b) how the content is created and/or rendered. The term "digital content" refers to content which is encoded in binary digits (for example, zeroes and ones). In the context of applications involving digital computers, the terms "content", "digital content", and "digital asset" are often used interchangeably.

As used herein, the term "content browser" refers, in addition to its ordinary meaning, to a software application capable of retrieving and rendering content obtained from a storage repository. Content that is to be browsed can be identified by a network address that is input by a user or that is selected from previously rendered content in the form of a hyperlink. A content browser can be configured to render content stored according to a wide variety of file formats and protocols. The functionality provided by a content browser can be extended through the use of plugins and/or extensions which can be configured to, for example, establish a Web-Socket connection that allows content to be actively pushed between connected devices. A web browser is a class of content browser which is specifically configured for retrieving and rendering content accessible via the World Wide Web (WWW), although many web browsers are also capable of accessing information provided by content servers in private networks and by file servers in a range of different file systems.

System Architecture

FIG. 1 is a block diagram schematically illustrating selected components of a computer system that can be used to implement certain of the embodiments disclosed herein. As illustrated, these embodiments can be viewed as a series of interactions between a content sender 100, a content recipient 200, and a networked server 300. The architecture and functionality of the various components and subcomponents comprising the computer system illustrated in FIG. 1 will be described in turn, although it will be appreciated that alternative embodiments may include additional or fewer components, and therefore may not be limited to the particular set of components and the particular hardware architecture illustrated in FIG. 1. More specifically, in other embodiments additional or alternative components and sub-components can be configured to provide other content distribution functionality depending on the needs of a particular application. For example, such additional or alternative components and subcomponents may take the form of one or more server-side modules which interact with or respond to user input received from content sender 100 and/or content recipient 200.

Content sender 100 and content recipient 200 can each be associated with a computer system that comprises, for example, one or more devices selected from a desktop or laptop computer, a workstation, a tablet, a smartphone, a set-top box or any other such computing device. The term "content sender" therefore refers to both a particular user who invokes a content sending process and the computing device from which the content is sent. Likewise, the term "content recipient" refers to both a particular user who receives content and the computing device at which the content is received. Networked server 300 may comprise a content server capable of responding to and fulfilling requests for access to shared resources hosted or otherwise made available via server 300. In certain embodiments such resources include content stored in a content repository 310 hosted by server 300. Content sender 100, content recipient 200, and networked server 300 can be implemented in a generalized client-server computing environment, thereby allowing sender 100 and recipient 200 to access content hosted by server 300. In some embodiments server 300 comprises a single computing device, while in other embodiments server 300 comprises a geographically distributed network of tens, hundreds, thousands, or more enterprise class servers capable of hosting content accessed by an even larger number of content senders and recipients.

Still referring to the example embodiment illustrated in FIG. 1, content sender 100 and content recipient 200 each include a processor 110, 210; a memory 120, 220; an operating system 140, 240; a communications module 150, 250; a content browser 160, 260; and a geolocation module 170, 270. As can be further seen, a bus and/or interconnect 180, 280 is also provided to allow for inter- and intra-device communications using, for example, communications module 150, 250. Content sender 100 and content recipient 200 optionally include, or are coupled to, appropriate peripheral hardware components, such as a display, a textual input device, and/or a pointer-based input device. Content sender 100 and content recipient 200 are connected to a network 400 to allow for communications with each other, as well as with other resources and/or devices, such as networked server 300. Network 400 may be a local area network (such as a home-based or office network), a wide area network (such as the Internet), or a combination of such networks, whether public, private, or both. In some cases access to resources on a given network or computing system may require credentials such as usernames, passwords, and/or any other suitable security mechanism. Other componentry and functionality not reflected in the illustrations will be apparent in light of this disclosure, and it will therefore be appreciated that the claimed invention is not intended to be limited to any particular hardware configuration. Thus in other embodiments content sender 100 and content recipient 200 may comprise additional or alternative subcomponents as compared to those illustrated in FIG. 1.

Processors 110, 210 can be any suitable processors, and may include one or more coprocessors or controllers, such as an audio processor or a graphics processing unit, to assist in control and processing operations of content sender 100 and content recipient 200. Memory 120, 220 can be implemented using any suitable type of digital storage, such as one or more of a disk drive, a universal serial bus drive, flash memory and/or random access memory. Operating systems 140, 240 may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with content sender 100 and content recipient 200, and therefore may also be implemented using any suitable existing or subsequently-developed platform. Communications modules 150, 250 can be any appropriate network chip or chipset which allows for wired and/or wireless connection to network 400 or other peripheral resources, thereby enabling content sender 100 and content recipient 200 to communicate with other local and/or remote computer systems, servers, peripheral hardware devices, or resources. In certain embodiments communications with networked server 300 conform to the hypertext transfer protocol (HTTP).

Geolocation modules 170, 270 can be any suitable combination of hardware and/or software capable of estimating a physical location of the content sender 100 or content recipient 200. For example, in certain embodiments at least one of geolocation modules 170, 270 comprises a global positioning system (GPS) antenna that is configured to work in conjunction with software that is capable of converting GPS signals into an estimated geographic location. In other embodiments at least one of geolocation modules 170, 270 comprises software configured to estimate a physical location based on an Internet Protocol (IP) address or other network parameter that is assigned to a particular computing device. In still other embodiments at least one of geolocation modules 170, 270 comprises an antenna that is configured to receive network data from multiple wireless access points and software that is configured to use a triangulation algorithm to estimate a physical location based on factors such as observed signal strength and directionality. For example, such an antenna may be configured to receive wireless and/or cellular data signals.

Content browsers 160, 260 can be used to facilitate the retrieval and rendering of content by content sender 100 and content recipient 200. Content that is to be browsed can be identified by a network address that is input by a user or that is selected from previously rendered content in the form of a hyperlink. Content browsers 160, 260 can be configured to render content stored according to a wide variety of file formats and protocols. In certain embodiments at least one of content browsers 160, 260 comprises a software application selected from a web browser, an electronic mail reader, or a newsreader. Other types of software applications can be used to retrieve and render content in other embodiments. Examples of commercially-available content browsers include Google Chrome (Google Inc., Mountain View, Calif.), Internet Explorer (Microsoft Corp., Redmond, Wash.), Microsoft Outlook (Microsoft Corp., Redmond, Wash.), Mozilla Thunderbird (Mozilla Foundation, Mountain View, Calif.), Opera Mail (Opera Software, Oslo, Norway), and Adobe Acrobat (Adobe Systems Incorporated, San Jose, Calif.). It will be appreciated that the embodiments disclosed herein are configured to work with a wide variety of existing and subsequently-developed content browsers.

The functionality provided by content browsers 160, 260 can be extended through the use of plugins, extensions, add-ons, modules or other such "active content" that is configured to provide specific functionality. For example, connection management modules 162, 262 can be configured to establish and maintain an open communication channel between a client (such as content sender 100 or content recipient 200) and a server (such as networked server 300). Such functionality can be provided according to a variety of techniques. For example, in one embodiment a content recipient connection management module 262 comprises a WebSocket programming element configured to establish a persistent open communication channel between content recipient 200 and networked server 300. This enables server 300 to "push" content to content browser 260 without being solicited for such content by content recipient 200. Likewise, a content sender connection management module 162 can be understood as comprising a WebSocket programming element configured to establish a persistent open communication channel between content sender 100 and networked server 300. This enables content sender 100 to push information to server 300 which can, in turn, be distributed to one or more content recipients 200, as disclosed herein. In general, a WebSocket plugin can be understood as providing a persistent open communication channel between a server and a client. While the WebSocket protocol constitutes one way of providing such communications, any of a variety of other suitable existing or subsequently-developed techniques for pushing unsolicited content between clients and servers, including the use of client-side timers, can be implemented in other embodiments.

Still referring to the example embodiment of FIG. 1, content browsers 160, 260 each optionally include a user interface module 164, 264 that can be configured to receive user input that manipulates how content is shared between content sender 100 and content recipient 200. For example, a content sender user interface module 164 can be configured to provide a user interface element, such as a button or a switch, that can be used to activate content sharing with identified content recipients. Content sender user interface module 164 can also be configured to provide access to configuration settings which can be used to manipulate, for example, which users receive shared content. Likewise, a content recipient user interface module 264 can be configured to provide a user interface element, such as a button or a switch, that can be used to indicate that shared content should be automatically broadcast from server 300 to content recipient 200. Content recipient user interface module 264 can also be configured to provide access to configuration settings which can be used to manipulate, for example, how received content is displayed (for instance, it could be automatically rendered by content browser 260, or it could simply be announced via a system tray notification). Other user interface functionality can be provided by user interface modules 164, 264 in other embodiments.

The embodiments disclosed herein can be implemented in various forms of hardware, software, firmware, and/or special purpose processors. For example, in one embodiment a non-transitory computer readable medium has instructions encoded thereon that, when executed by one or more processors, cause one or more of the real-time content sharing methodologies disclosed herein to be implemented. The instructions can be encoded using one or more suitable programming languages, such as C, C++, object-oriented C, JavaScript, Visual Basic .NET, BASIC, or alternatively, using custom or proprietary instruction sets. Such instructions can be provided in the form of one or more computer software applications and/or applets that are tangibly embodied on a memory device, and that can be executed by a computer having any suitable architecture. In one embodiment the system can be hosted on a given website and implemented using JavaScript or another suitable browser-based technology.

The functionalities disclosed herein can optionally be incorporated into software applications other than those specifically configured for the delivery and consumption of rendered content. For example, a word processing or desktop publishing application may include a content sharing module configured to receive content items shared in real-time from other collaborating users. As a result, the computer software applications disclosed herein may include a number of different modules, sub-modules, or other components of distinct functionality that can provide information to, or receive information from, still other components and/or services. These modules can be used, for example, to communicate with input and/or output devices such as a pointer device, a display screen, a touch sensitive surface, a printer, and/or any other suitable input/output device. Other components and functionality not reflected in the illustrations will be apparent in light of this disclosure, and it will be appreciated that the embodiments disclosed herein are not intended to be limited to any particular hardware and/or software configuration. Thus in other embodiments the configuration of the computer system illustrated in FIG. 1 may comprise additional, fewer, or alternative components.

The aforementioned non-transitory computer readable medium may be any suitable medium for storing digital information, such as a hard drive, a server, a flash memory, and/or random access memory. In alternative embodiments the computer and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that the various embodiments disclosed herein are not intended to be limited to any particular system architecture.

Data Pipelines and Methodology

Figure 2:
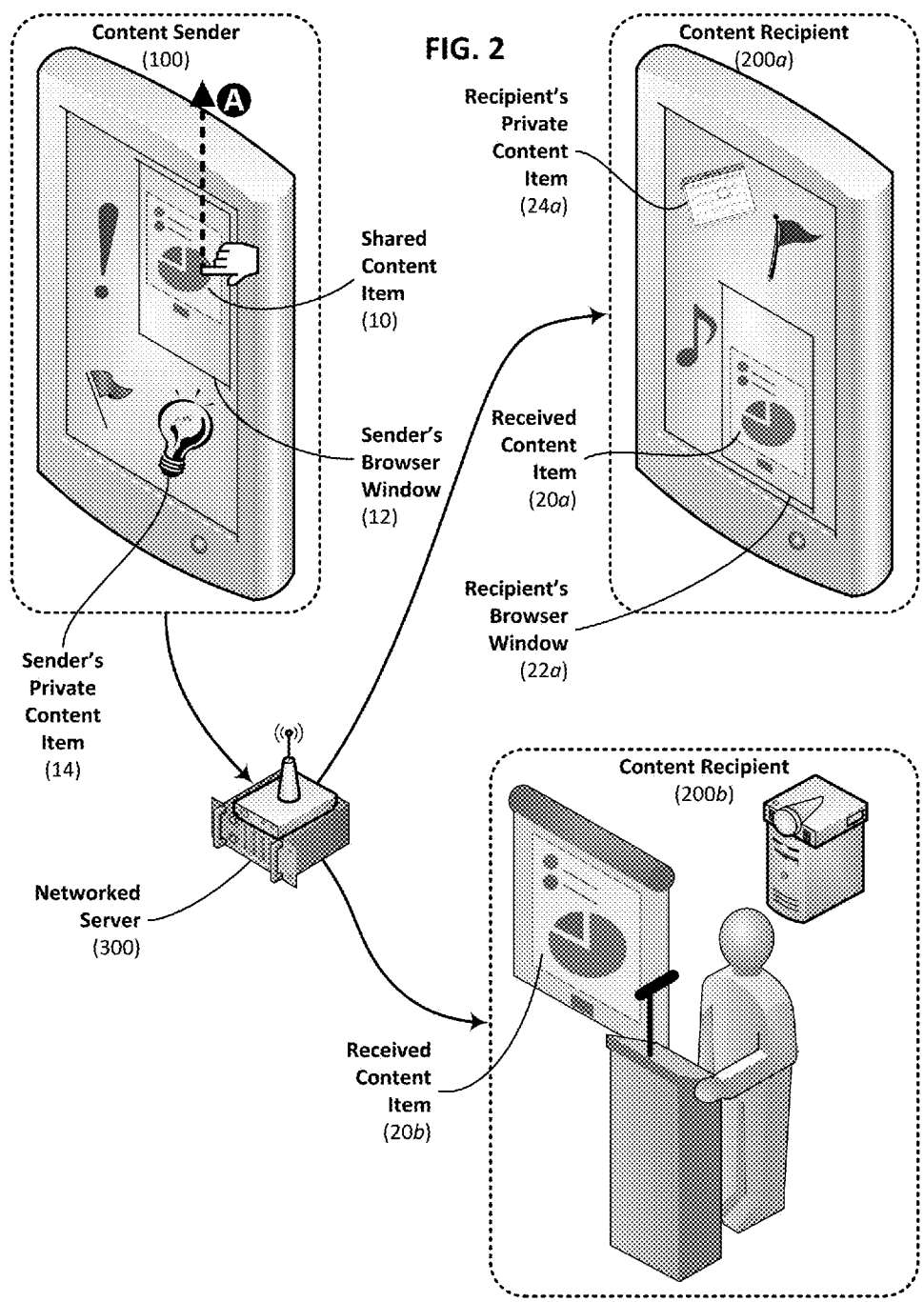
FIG. 2 is a data flow diagram schematically illustrating example data flows that occur when a shared content item is broadcast from a content sender's device to a plurality of content recipients via a networked server.

FIG. 2 is a data flow diagram schematically illustrating example data flows that occur when a shared content item 10 is broadcast from content sender 100 to a plurality of content recipients 200*a*, 200*b* via networked server 300. In this example embodiment content sender 100 and first content recipient 200*a* are illustrated as being associated with a tablet computer, while second content recipient 200*b* is illustrated as being associated with a desktop computer that is coupled to a projector. This arrangement is particularly likely to arise where content sender 100 and first content recipient 200*a* are audience members attending a presentation given by second content recipient 200*b*. In this context, a particular attendee (content sender 100) can be understood as seeking to share content item 10 with other audience members (content recipient 200*a*) and the presenter (content recipient 200*b*). However, this represents only one particular application, and thus it will be appreciated that the specific user-hardware associations illustrated in FIG. 2 are provided by way of example only. In alternative embodiments content senders and recipients may be associated with any suitable computing device. In general, certain of the techniques disclosed herein enable content sender to broadcast the shared content in real-time to one or more content recipients.

Content sender 100 may have access to a variety of different content items, including content items obtained from networked server 300, content items obtained from other content sources, and locally generated content items. However, content sender 100 may wish to share only certain of these content items. Thus a distinction can be drawn between one or more shared content items 10 and one or more private content items 14 associated with content sender 100. To this end, in certain embodiments content sender 100 may open a content browser window 12 that is specifically configured for content sharing, such that only those content items rendered in the designated content browser window 12 will be shared with identified content recipients 200*a*, 200*b* upon activation of content sharing functionality. This provides content sender 100 with additional control over which content items are shared, which is in contrast to existing remote desktop applications which are configured to share an entire desktop environment.

Content sender 100 can invoke content sharing by, for example, selecting a user interface element. In embodiments implemented using a touchscreen interface, content sender 100 can invoke content sharing by performing a designated gesture to which user interface module 164 is configured to be responsive. For instance, in one embodiment performing an upward swipe gesture A, as illustrated in FIG. 2, can cause content items 10 contained within content browser window 12 to be shared with identified content recipients 200*a*, 200*b*. In certain embodiments the location of the swipe gesture can determine which content items are shared. For example, where multiple browser windows are open, performing the swipe gesture over a particular browser window will cause content items contained within that specific browser window to be shared. In an alternative embodiment, user interface module 164 can be configured to share all displayed content items in response to the swipe gesture. In some cases invoking content sharing requires at least two user inputs (an activate sharing gesture and a content selection gesture), while in other cases invoking content sharing requires only one user input (a content selection gesture, such as an upward swipe over the content to be shared). In general, using a touchscreen-based gesture to invoke content sharing makes such implementations particularly well-suited for use with the portable devices which are likely to be used in collaborative working environments such as at meetings and presentations.

As illustrated in FIGS. 1 and 2, upon detecting that content sharing has been invoked, content browser 160 can be configured to send a shared content reference 10' to networked server 300. In particular, where the shared content is hosted by networked server 300, it is unnecessary for the entirety of such content to be returned from content sender 100 to networked server 300. Rather, sending only reference 10' reduces required bandwidth, decreases latency, and enables networked server 300 to automatically locate and push the content item to the one or more identified content recipients 200a, 200b. However, it will be appreciated that where content sender 100 wishes to broadcast content which is not hosted by networked server 300 or some other networked resource, the shared content item itself can be sent from content sender 100 to networked server 300.

In general, content recipients 200 can be identified in a number of ways. In one implementation content sender 100 can open a communication channel to which interested content recipients 200 can subscribe. For example, open communication channels can be advertised at a web portal that is accessible to potential content recipients. Selecting and subscribing to an available channel allows a user to receive content shared by the content sender that established the channel. In particular, a WebSocket communication channel can be established between networked server 300 and each subscribing content recipient 200. When content sender 100 invokes content sharing, such as by performing the aforementioned upward swipe gesture A, the identified shared content item 10 can be transmitted from server 300 to content recipient 200 via the previously established communication channel. This configuration allows content senders to send content to recipients with a gesture that physically represents swiping the content off their device to the recipient's device.

Additionally or alternatively, content recipients 200 can be identified using geolocation functionality provided by, for example, geolocation modules 170, 270. For example, users within a designated physical region, such as within a certain proximity to a content sender, can be identified as potential content recipients. In such case, an open communication channel with each of the identified potential content recipients can be established automatically. In alternative embodiment, each of the identified potential content recipients can be presented to the content sender for approval as authorized content recipients. Just as in the case of the aforementioned subscription model, any suitable communication protocol can be used to establish and maintain an appropriate open communication channel between networked server 300 and identified content recipients 200. Such an arrangement can effectively establish an automatic subscription to shared content based on location, and can be useful where all users within a particular meeting room or other location should receive content which content sender 100 shares. In certain embodiments a combined subscription and geolocation model can be used to identify content recipients 200, thereby allowing content sharing amongst collaborators based on either or both criterion.

Upon receipt of shared content reference 10', or in some cases upon receipt of the shared content item itself, networked server 300 can be configured to push the shared content to one or more content recipients. This can be accomplished via an open communication channel between server 300 and one or more content recipients 200. In some cases, a WebSocket programming element is used to establish such a communication channel, although other techniques such as the use of client-side timers, can be used in other embodiments. Implementing client-server communication using browser-based tools eliminates any requirement that content senders 100 or content recipients 200 install dedicated software before sharing or receiving content. Instead, a user can simply navigate to and retrieve a particular webpage that includes active content in the form of programming elements that, when executed, establish the appropriate communication channels. That is, in such embodiments the disclosed content sharing can be understood as a browser-to-browser interaction that does not rely on a native or dedicated content sharing application installed on any particular client. Furthermore, while an open communication channel is described here as existing between networked server 300 and one or more content recipients 200, it will be appreciated that such a channel may also be provided between content sender 100 and networked server 300 as well. Such a configuration allows content recipients to respond to received content by sending other content back to content sender, thereby effectively reversing the roles of content sender and content recipient.

For example, from the perspective of content recipient 200a, received content item 20a can be configured to appear in a browser window 22a associated with content sharing operations. This allows the received content item 20a to appear adjacent to one or more private content items 24a available to content recipient 200a. In an alternative configuration, such as from the perspective of content recipient 200b, received content item 20b can be configured to be displayed in a full-screen mode, such as may be particularly appropriate in the context of a projected display. Thus in some cases content can be represented differently depending on the type of display available to a particular content recipient 200a, 200b. Other less intrusive techniques for providing notification that shared content has been received can be implemented in other embodiments, such as via display of a system tray notification message and/or icon. In any case, in such embodiments content recipient 200 can be presented with a received content item 20 immediately after content sender 100 elects to share such item, thereby providing a real-time content sharing user experience. If content recipient 200 no longer wishes to receive shared content from content sender 100, simply closing the content browser window or other application supporting the open communication channel will cause such content sharing to end.

FIGS. 3A and 3B are flowcharts illustrating example methods of broadcasting and receiving content from the perspective of a content sender and a content recipient, respectively. FIG. 4 is a flowchart illustrating an example method of using a networked server to manage broadcast communications between a content sender and a content recipient. As can be seen, the disclosed methodologies include a number of phases and sub-processes, the sequence of which may vary from one embodiment to the next. However, when considered in the aggregate, these phases and sub-processes form a complete real-time content sharing functionality that is responsive to user commands in accordance with certain of the embodiments disclosed herein. This methodology and its variations can be implemented, for example, using the system architecture illustrated in FIG. 1 and described herein, although other systems and architectures can be used in other embodiments, as will be apparent in light of this disclosure. To this end, the correlation of the various functions illustrated in FIGS. 3A, 3B, and 4 to the specific components, systems, and sub-modules illustrated in FIG. 1 is not intended to imply any structural or use limitations. Rather other embodiments may include, for example, varying degrees of integration where multiple functionalities are effectively performed by one user, system, component, or sub-module. For example, in certain embodiments one or more of the content browsers 160, 260 may include the geolocation functionality described herein as being associated with respective geolocation modules 170, 270. Thus other embodiments may have fewer or more components or systems depending on the granularity of a particular implementation. Numerous variations and alternative configurations will therefore be apparent in light of this disclosure.

As illustrated in FIG. 3A, a method 1000 for broadcasting content from the perspective of content sender 100 commences with content sender 100 opening content browser window. See reference numeral 1100 in FIG. 3A. In response to input received from content sender 100, content sharing can be activated and a content sharing channel can be opened. See reference numeral 1200 in FIG. 3A. As disclosed herein, in certain embodiments such user input may comprise multiple user actions, such as an activate sharing gesture followed by a content selection gesture. In other embodiments such user input may comprise a single user action, such as an upward swipe over the particular content which is to be shared. Once a content sharing channel is opened, content sender 100 can select the content items which are to be shared. See reference numeral 1400 in FIG. 3A. In certain embodiments the same user interaction can be used to both activate content sharing and select the content items which are to be shared. One example of such a user interaction is an upward swipe over the content to be shared, as performed on a touchscreen display. Content sender 100 may optionally select certain content recipients 200 that are authorized to receive shared content item. See reference numeral 1500 in FIG. 3A. In such case the selection of authorized content recipients may be made (a) from a list of potential content recipients who have requested to subscribe to content broadcasts from a particular content sender, (b) from a list of potential content recipients within a certain physical region, such as within a certain physical proximity to content sender 100, and/or (c) from some other subset of potential content recipients.

As illustrated in FIG. 3B, a method 2000 for receiving content from the perspective of content recipient 200 commences with content recipient 200 opening a content browser window. See reference numeral 2100 in FIG. 3B. Content recipient 200 may then select a content sharing channel opened by content sender 100. See reference numeral 2200 in FIG. 3B. Such a selection can be made by, for example, pointing the content browser to a particular content sharing portal configured to provide browser-based functionality for establishing an open communication channel between content recipient 200 and content server 300. In other embodiments, the aforementioned web portal can be configured to provide content recipient 200 with a list of available communication channels opened by one or more content senders 100. In some cases the content sharing channels made available to content recipient 200 depend on the geographic location of content recipient 200, as disclosed herein. In any case, once content recipient 200 establishes an open communication channel with content server 300, shared content can be received. See reference numeral 2300 in FIG. 3B.

As illustrated in FIG. 4, a method 3000 for using networked server 300 to manage broadcast communications between content sender 100 and content recipient 200 commences with networked server 300 establishing a connection with content sender 100. See reference numeral 3100 in FIG. 4. Such a connection may occur as a result of content sender 100 requesting content and/or functionality from server 300, for example, by retrieving a webpage containing active content from server 300. This connection may comprise, for example, an open communication channel that allows content sender 100 to "push" content to networked server 300 for subsequent broadcast. One or more content recipients 200 can be identified. See reference numeral 3200 in FIG. 4. For example, networked server 300 can be configured to broadcast the availability of one or more open content sharing channels established by one or more content senders 100. See reference numeral 3210 in FIG. 4. This can be accomplished, for example, via a web portal listing open content sharing channels. Content recipients 200 can be identified based on receipt of a request to subscribe to an open content sharing channel. See reference numeral 3212 in FIG. 4. Additionally or alternatively, content recipients 200 can be identified based on geolocation, such as based on being within a designated physical region, such as within a certain physical proximity to content sender 100. See reference numeral 3220 in FIG. 4.

Regardless of how the one or more content recipients 200 are identified, an open communication channel can be established between networked server 300 and the one or more content recipients 200. See reference numeral 3300 in FIG. 4. Such a connection can be established, for example, using functionality provided by a browser plugin transmitted from networked server 300 to content recipient 200. This advantageously allows such a connection to be established based simply on an initial client-server interaction between content recipient 200 and server 300. Once such an open communication channel is established, server 300 can receive references to shared content from content sender 100, as well as actual shared content items. See reference numeral 3400 in FIG. 4. The shared content items can then be pushed to an identified content recipient 200 via the respective open communication channel for that recipient. See reference numeral 3500 in FIG. 4. The result is real-time content sharing between a browser associated with content sender 100 and a browser associated with content recipient 200. Because the content is shared on a browser-to-browser basis, no native or dedicated content sharing applications are required to be installed by either content sender 100 or content recipient 200. Among other advantages, this encourages impromptu multiuser collaboration based simply on use of a common web portal.

CONCLUSION

Numerous variations and configurations will be apparent in light of this disclosure. For example, one embodiment provides a method for sharing content that comprises establishing first and second open communication channels between a content server and respective first and second client computing devices. The method further comprises, in response to a user interaction detected at the first client computing device, receiving, at the content server via the first open communication channel, data corresponding to shared content that is to be broadcast to the second client computing device. The method further comprises broadcasting the shared content from the content server to the second client computing device via the second open communication channel. Broadcasting causes the shared content to be displayed at the second client computing device without user interaction with the second client computing device. In some cases the first open communication channel is established in response to the first client computing device executing a browser plugin retrieved from the content server. In some cases the second open communication channel is established in response to the second client computing device executing a browser plugin retrieved from the content server. In some cases at least one of the first and second open communication channels provides duplex communications according to a WebSocket protocol. In some cases the second open communication channel is capable of obtaining the shared content from the content server based on a client-side timer running on the second client computing device. In some cases the user interaction is a swiping gesture performed on a touch sensitive surface that forms part of the first client computing device. In some cases the data corresponding to the shared content comprises a network address associated with a content item stored in a content repository hosted by the content server. In some cases the data corresponding to the shared content comprises the shared content itself. In some cases (a) the second open communication channel is established is response to the second client computing device executing a browser plugin in a content browser running on the second client computing device; and (b) broadcasting the shared content causes the shared content to be displayed in the content browser.

Another example embodiment provides a system for sharing content that comprises a networked content server that is configured to receive, from a first client device, data corresponding to shared content, and that is configured to broadcast the shared content to a plurality of second client devices in response to such receipt. The shared content is broadcast to the plurality of second client devices via a respective plurality of open communication channels. The system further comprises a content repository hosted by the networked content server, the content repository having the shared content stored therein. The system further comprises active content that forms part of a webpage stored within the content repository, the active content configured to cause a web browser running on the first client device to transmit the data corresponding to the shared content to the networked content server in response to detection of a user interface interaction with the shared content. In some cases the system further comprises a geolocation module configured to estimate a physical location of a plurality of distributed client devices, wherein (a) the plurality of second client devices are included in the plurality of distributed client devices; and (b) the plurality of second client devices are estimated to be physically located within a target audience region. In some cases the user interface interaction with the shared content is a swipe gesture performed on a touch sensitive surface displaying the shared content. In some cases the data corresponding to the shared content comprises a storage address associated with the content repository. In some cases the active content is further configured to establish a particular open communication channel between the networked content server and a corresponding particular second client device, the particular open communication channel corresponding to a WebSocket communication protocol. In some cases the networked content server is further configured to serve the webpage to the first client device and at least one of the plurality of second client devices before receiving the data corresponding to the shared content.

Another example embodiment provides a non-transitory computer readable medium having instructions encoded thereon that, when executed by one or more processors cause a content sharing process to be carried out. The process comprises establishing a first open communication channel between a content server and a first client device. The process further comprises establishing a second open communication channel between the content server and a second client device. The process further comprises, in response to a user interaction detected at the first client device, receiving, at the content server via the first open communication channel, data corresponding to shared content that is to be broadcast to the second client device. The process further comprises broadcasting the shared content from the content server to the second client device via the second open communication channel. Broadcasting causes the shared content to be displayed at the second client device without user interaction with the second client device. In some cases (a) the content sharing process further comprises (i) generating a channel listing that includes the first open communication channel, and (ii) identifying the second client device based on a selection of the first open communication channel that is received from the second client device; and (b) the second open communication channel is established in response to identifying the second client device. In some cases the user interaction is a swiping gesture performed on a touch sensitive surface that forms part of the first client device. In some cases (a) the content sharing process further comprises identifying the second client device based on a physical location of the second client device; and (b) the second open communication channel is established in response to identifying the second client device. In some cases (a) the content sharing process further comprises identifying the second client device based on a physical proximity of the first and second client devices; and (b) the second open communication channel is established in response to identifying the second client device.

The foregoing description of selected embodiments has been presented for purposes of illustration and description. It is not intended to be exhaustive or to limit the invention to the precise form described. Many modifications and variations are possible in light of this disclosure. Therefore it is intended that the scope of the invention be limited not by this detailed description, but rather by the claims appended hereto.

What is claimed is:

1. A method for content sharing that comprises:
establishing first and second open communication channels between a content server and respective first and second client computing devices;
in response to a command detected by a content browser executing on the first client computing device, receiving, at the content server via the first open communication channel, a plurality of network addresses associated with a corresponding plurality of content items that were displayed by the content browser when the command was detected; and
broadcasting the plurality of content items from the content server to the second client computing device, wherein the content items are broadcasted via the second open communication channel, and wherein broadcasting causes the content items to be displayed at the second client computing device without any command being invoked at the second client computing device.

2. The method of claim 1, wherein the first open communication channel is established in response to the first client computing device executing a browser plugin retrieved from the content server.

3. The method of claim 1, wherein the second open communication channel is established in response to the second client computing device executing a browser plugin retrieved from the content server.

4. The method of claim 1, wherein at least one of the first and second open communication channels provides duplex communications according to a WebSocket protocol.

5. The method of claim 1, wherein the second open communication channel is capable of obtaining the content items from the content server based on a client-side timer running on the second client computing device.

6. The method of claim 1, wherein the command detected by the content browser is a swiping gesture performed on a touch sensitive surface that forms part of the first client computing device.

7. The method of claim 1, wherein at least one of the plurality of content items is stored in a content repository hosted by the content server.

8. The method of claim 1, wherein: the second open communication channel is established in response to the second client computing device executing a browser plugin in the content browser running on the second client computing device.

9. A system for sharing content that comprises:
a networked content server that is configured to receive, from a first client device, a plurality of network addresses associated with a corresponding plurality of shared content items;
a content repository hosted by the networked content server, the content repository having the content items stored therein; and
active content that forms part of a webpage stored within the content repository, the active content configured to cause a web browser running on the first client device to transmit the shared content items to the networked content server in response to detection of a user interface command that is (a) invoked with respect to the content items at the first client device, and (b) detected by the web browser,
wherein transmitting the shared content items causes the shared content items to be displayed at each of a plurality of second client devices without any command being invoked at such devices,
wherein the shared content items are transmitted to the plurality of second client devices via a respective plurality of open communication channels, and
wherein the shared content items were displayed by the web browser when the user interface command was detected.

10. The system of claim 9, further comprising a geolocation module configured to estimate a physical location of a plurality of distributed client devices, wherein:
the plurality of second client devices are included in the plurality of distributed client devices; and
the plurality of second client devices are estimated to be physically located within a target audience region.

11. The system of claim 9, wherein the user interface command invoked with respect to the shared content items is a swipe gesture performed on a touch sensitive surface displaying the shared content items.

12. The system of claim 9, wherein the active content is further configured to establish a particular one of the open communication channels between a particular one of the second client devices and the networked content server, the particular open communication channel corresponding to a WebSocket communication protocol.

13. The system of claim 9, wherein the networked content server is further configured to serve the webpage to the first client device and at least one of the plurality of second client devices before the network addresses are transmitted to the networked content server.

14. A non-transitory computer readable medium having instructions encoded thereon that, when executed by one or more processors cause a content sharing process to be carried out, the process comprising:
establishing a first open communication channel between a content server and a first client device;
broadcasting availability of the first open communication channel via a web portal listing;
receiving, from a second client device, a subscription request for the first open communication channel;
in response to receiving the subscription request from the second client device, establishing a second open communication channel between the content server and the second client device;
in response to a user interaction detected by a content browser executing on the first client device, receiving, at the content server via the first open communication channel, a plurality of network addresses associated with a corresponding plurality of content items that were displayed by the content browser when the user interaction was detected; and
broadcasting the plurality of network addresses from the content server to the second client device from which the subscription request was received, wherein the network addresses are broadcasted via the second open communication channel, and wherein broadcasting causes the content items associated with the network addresses to be downloaded to and displayed at the second client device without user interaction with the second client device.

15. The non-transitory computer readable medium of claim 14, wherein the user interaction is a swiping gesture performed on a touch sensitive surface that forms part of the first client device.

16. The non-transitory computer readable medium of claim 14, wherein
broadcasting availability of the first open communication channel further comprises identifying a plurality of distributed client devices within a specified physical proximity of the first client device and transmitting availability of the first open communication channel to the identified plurality of distributed client devices, and
the second client device is included in the identified plurality of distributed client devices.

17. The non-transitory computer readable medium of claim 14, wherein a plurality of second open communication channels are established in response to receiving a corresponding plurality of subscription requests for the first open communication channel.

18. The non-transitory computer readable medium of claim 14, wherein: the second open communication channel is capable of obtaining the content items associated with the network addresses from the content server based on a client-side timer running on the second client device.

19. The non-transitory computer readable medium of claim 14, wherein at least one of the first and second open communication channels provides duplex communications according to a WebSocket protocol.

20. The non-transitory computer readable medium of claim 14, wherein at least one of the plurality of content items are stored in a content repository hosted by the content server.

* * * * *

UNITED STATES PATENT AND TRADEMARK OFFICE
CERTIFICATE OF CORRECTION

PATENT NO. : 9,906,614 B2
APPLICATION NO. : 14/269342
DATED : February 27, 2018
INVENTOR(S) : Alexandre Capt, Damien Antipa and Ondrej Florian Page 1 of 1

It is certified that error appears in the above-identified patent and that said Letters Patent is hereby corrected as shown below:

In the Claims

Column 15, Line 28, Claim 9, replace "the content items" with --the shared content items--.

Column 15, Lines 35-36, Claim 9, replace "the content" with --the shared content--.

Signed and Sealed this
Twenty-fourth Day of April, 2018

Andrei Iancu
*Director of the United States Patent and Trademark Office*